United States Patent Office.

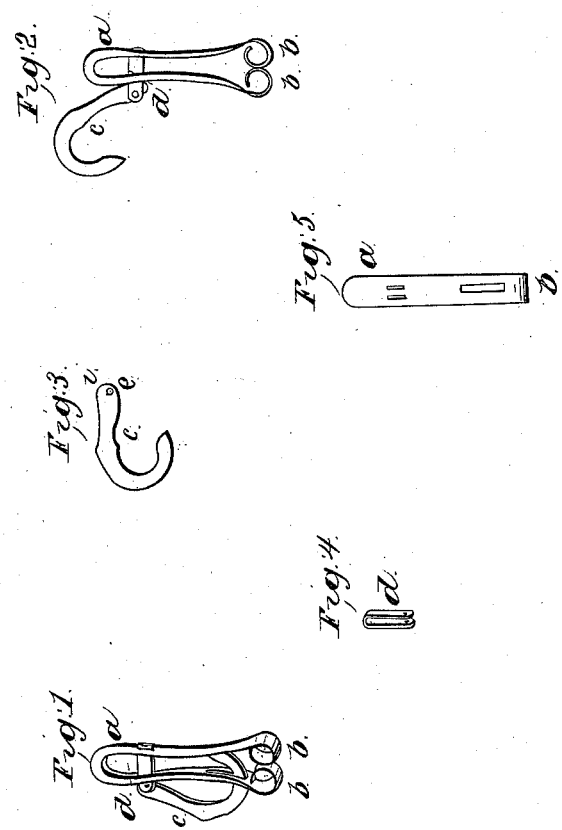

CHARLES L. SPENCER, OF PROVIDENCE, RHODE ISLAND.

Letters Patent No. 83,562, dated October 27, 1868.

IMPROVEMENT IN HAT-HOOK.

The Schedule referred to in these Letters Patent and making part of the same.

*To whom it may concern:*

Be it known that I, CHARLES L. SPENCER, of the city and county of Providence, and State of Rhode Island, have invented a new and useful Improvement in Hat-Hooks; and I do hereby declare that the following is a full, clear, and exact description of the same, reference being had to the annexed drawing, making a part of this specification, in which—

Figure 1 is a perspective view of my invention.

Figure 2 is a side view, with the hook thrown open.

Figures 3, 4, and 5 are detail parts.

In the accompanying drawing, *a*, fig. 1, is a piece of metal, formed curving, and shaped like a pair of spring-tongs, the ends of which, *b b*, are bent and brought nearly together.

Letter, *d*, fig. 4, represents another piece of metal, bent so the sides are brought parallel with each other, leaving a space between them, forming a strap. This strap is fitted through holes on the sides of *a*, fig. 5, there being two on each side, a suitable distance from the top, for that purpose.

*a* also has a slot on the lower part of one of its sides, for the hook to drop into when closed, as shown on fig. 1.

Letter *c*, fig. 3, represents a well-known hook, having a hole at one end, near the edge, at point *e*. The distance from the hole to the edge increases in following it around to point *i*, making an increase-cam. This hook is held or connected to *a* by the strap *d*, as shown on figs. 1 and 2, the strap *d* being passed through the holes near the top of *a*. The hook *c* is riveted to its ends, the same as a knife-blade in a common pocket-knife, bringing that end of hook *c* to bear against *a*.

To use my invention when in position as represented by fig. 1, the ends *b b* of *a* are pushed on the rim of a hat or other articles requiring suspension. The hook *c* is then swung open, as shown on fig. 2, causing the increase-cam to close the ends *b b* firmer in supporting the weight, when the hook is caught on a projection, by drawing the ends of strap *d* farther through that side of *a*, as shown on fig. 2.

Its advantages are simplicity, compactness, and being easily carried.

It is always ready for use, and, having a pointed hook, it can be hung on a projection as easily as spanning the hook on a wire.

Its use in railway-cars and otherwise is of the greatest convenience.

What I claim, and desire to secure by Letters Patent of the United States, is—

The combination of the hook, strap, and tongs, when constructed to operate substantially as set forth and for the purpose specified.

CHARLES L. SPENCER.

Witnesses:
JOHN A. GARDNER,
JOSHUA WILBOUR.